(12) United States Patent
Spiegel

(10) Patent No.: US 11,252,158 B2
(45) Date of Patent: Feb. 15, 2022

(54) INTERACTIVE USER-INTERFACE TO ADJUST ACCESS PRIVILEGES

(71) Applicant: Snap Inc., Santa Monica, CA (US)

(72) Inventor: Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/116,480

(22) Filed: Dec. 9, 2020

(65) Prior Publication Data

US 2021/0168144 A1 Jun. 3, 2021

Related U.S. Application Data

(63) Continuation of application No. 15/851,121, filed on Dec. 21, 2017, now Pat. No. 10,887,308, which is a
(Continued)

(51) Int. Cl.
*H04L 12/58* (2006.01)
*H04L 29/06* (2006.01)
(Continued)

(52) U.S. Cl.
CPC ............ *H04L 63/10* (2013.01); *G06F 3/01* (2013.01); *G06F 3/0481* (2013.01); *G06F 21/31* (2013.01);
(Continued)

(58) Field of Classification Search
CPC ....... H04L 63/10; H04L 67/306; H04L 51/12; G06F 3/0481; G06F 2203/04803; G06Q 50/01
See application file for complete search history.

(56) References Cited

U.S. PATENT DOCUMENTS

| | | |
|---|---|---|
| 5,999,932 A | 12/1999 | Paul |
| 6,154,764 A | 11/2000 | Nitta et al. |

(Continued)

OTHER PUBLICATIONS

"U.S. Appl. No. 13/672,654, Advisory Action dated Sep. 5, 2013", 3 pgs.
(Continued)

*Primary Examiner* — Shen Shiau
(74) *Attorney, Agent, or Firm* — Schwegman Lundberg & Woessner, P.A.

(57) ABSTRACT

A method of presenting an interactive user interface includes presenting member data within a social network interface, the member data being presented at a fixed position within the social network interface. A plurality of posts, arranged in a temporal order or according to category, are also presented within the social network interface. Further, a privacy bar interface element is presented at a first position within the social network interface. An action, as applied to a touch display of a client device, is detected, the action being to move the privacy bar interface element from the first position to a second position relative to the plurality of posts within the social network interface, and to divide the plurality of posts within the social network interface into a first subset of posts and a second subset of posts. First and second social profile access privileges are applied to the respective first and second subsets of posts responsive to the detecting of the action to move the privacy bar interface element from the first position to the second position, the first and second social profile access privileges being different from each other.

20 Claims, 8 Drawing Sheets

Related U.S. Application Data continuation of application No. 14/701,494, filed on Apr. 30, 2015, now Pat. No. 9,882,907, which is a continuation of application No. 14/325,260, filed on Jul. 7, 2014, now Pat. No. 9,026,943, which is a continuation of application No. 13/672,654, filed on Nov. 8, 2012, now Pat. No. 8,775,972.

(51) Int. Cl.
    *G06F 3/01*     (2006.01)
    *G06F 21/31*     (2013.01)
    *G06F 21/62*     (2013.01)
    *G06Q 50/00*     (2012.01)
    *G06F 3/0481*     (2022.01)
    *H04L 29/08*     (2006.01)

(52) U.S. Cl.
    CPC ......... *G06F 21/6245* (2013.01); *G06Q 50/01* (2013.01); *H04L 63/08* (2013.01); *H04L 63/0815* (2013.01); *H04L 67/306* (2013.01); *G06F 2203/04803* (2013.01); *H04L 51/12* (2013.01)

(56) References Cited

U.S. PATENT DOCUMENTS

| | | | |
|---|---|---|---|
| 6,167,435 | A | 12/2000 | Druckenmiller et al. |
| 6,204,840 | B1 | 3/2001 | Petelycky et al. |
| 6,216,141 | B1 | 4/2001 | Straub et al. |
| 6,310,694 | B1 | 10/2001 | Okimoto et al. |
| 6,484,196 | B1 | 11/2002 | Maurille |
| 6,665,531 | B1 | 12/2003 | Soderbacka et al. |
| 6,724,403 | B1 | 4/2004 | Santoro et al. |
| 6,757,713 | B1 | 6/2004 | Ogilvie et al. |
| 6,898,626 | B2 | 5/2005 | Ohashi |
| 7,124,164 | B1 | 10/2006 | Chemtob |
| 7,149,893 | B1 | 12/2006 | Leonard et al. |
| 7,203,380 | B2 | 4/2007 | Chiu et al. |
| 7,356,564 | B2 | 4/2008 | Hartselle et al. |
| 7,519,670 | B2 | 4/2009 | Hagale et al. |
| 8,001,204 | B2 | 8/2011 | Burtner et al. |
| 8,112,716 | B2 | 2/2012 | Kobayashi |
| 8,276,092 | B1 | 9/2012 | Narayanan et al. |
| 8,279,319 | B2 | 10/2012 | Date |
| 8,312,086 | B2 | 11/2012 | Velusamy et al. |
| 8,312,097 | B1 | 11/2012 | Siegel et al. |
| 8,379,130 | B2 | 2/2013 | Forutanpour et al. |
| 8,405,773 | B2 | 3/2013 | Hayashi et al. |
| 8,418,067 | B2 | 4/2013 | Cheng et al. |
| 8,471,914 | B2 | 6/2013 | Sakiyama et al. |
| 8,560,612 | B2 | 10/2013 | Kilmer et al. |
| 8,744,523 | B2 | 6/2014 | Fan et al. |
| 8,775,972 | B2* | 7/2014 | Spiegel .................... G06F 3/01 715/833 |
| 8,788,680 | B1 | 7/2014 | Naik |
| 8,797,415 | B2 | 8/2014 | Arnold |
| 8,856,349 | B2 | 10/2014 | Jain et al. |
| 9,026,943 | B1* | 5/2015 | Spiegel .................. H04L 63/10 715/833 |
| 9,037,577 | B1 | 5/2015 | Saylor et al. |
| 9,882,907 | B1* | 1/2018 | Spiegel ............... H04L 63/0815 |
| 10,572,102 | B1* | 2/2020 | Brichter ................ G06F 3/0485 |
| 10,887,308 | B1* | 1/2021 | Spiegel .................. H04L 63/08 |
| 2002/0047868 | A1 | 4/2002 | Miyazawa |
| 2002/0122659 | A1 | 9/2002 | Mcgrath et al. |
| 2002/0144154 | A1 | 10/2002 | Tomkow |
| 2003/0016247 | A1 | 1/2003 | Lai et al. |
| 2003/0052925 | A1 | 3/2003 | Daimon et al. |
| 2003/0164856 | A1 | 9/2003 | Prager et al. |
| 2004/0027371 | A1 | 2/2004 | Jaeger |
| 2004/0111467 | A1 | 6/2004 | Willis |
| 2004/0203959 | A1 | 10/2004 | Coombes |
| 2004/0243531 | A1 | 12/2004 | Dean |
| 2005/0078804 | A1 | 4/2005 | Yomoda |
| 2005/0097176 | A1 | 5/2005 | Schatz et al. |
| 2005/0104976 | A1 | 5/2005 | Currans |
| 2005/0114783 | A1 | 5/2005 | Szeto |
| 2005/0122405 | A1 | 6/2005 | Voss et al. |
| 2005/0193340 | A1 | 9/2005 | Amburgey et al. |
| 2005/0193345 | A1 | 9/2005 | Klassen et al. |
| 2005/0198128 | A1 | 9/2005 | Anderson |
| 2005/0223066 | A1 | 10/2005 | Buchheit et al. |
| 2006/0114338 | A1 | 6/2006 | Rothschild |
| 2006/0270419 | A1 | 11/2006 | Crowley et al. |
| 2007/0040931 | A1 | 2/2007 | Nishizawa |
| 2007/0073823 | A1 | 3/2007 | Cohen et al. |
| 2007/0082707 | A1 | 4/2007 | Flynt et al. |
| 2007/0192128 | A1 | 8/2007 | Celestins |
| 2007/0214216 | A1 | 9/2007 | Carrer et al. |
| 2007/0233801 | A1 | 10/2007 | Eren et al. |
| 2007/0243887 | A1 | 10/2007 | Bandhole et al. |
| 2007/0255456 | A1 | 11/2007 | Funayama |
| 2008/0025701 | A1 | 1/2008 | Ikeda |
| 2008/0033930 | A1 | 2/2008 | Warren |
| 2008/0104503 | A1 | 5/2008 | Beall et al. |
| 2008/0207176 | A1 | 8/2008 | Brackbill et al. |
| 2008/0222545 | A1 | 9/2008 | Lemay et al. |
| 2008/0250332 | A1 | 10/2008 | Farrell et al. |
| 2008/0256446 | A1 | 10/2008 | Yamamoto |
| 2008/0266421 | A1 | 10/2008 | Takahata et al. |
| 2008/0270938 | A1 | 10/2008 | Carlson |
| 2008/0313346 | A1 | 12/2008 | Kujawa et al. |
| 2009/0006565 | A1 | 1/2009 | Velusamy et al. |
| 2009/0015703 | A1 | 1/2009 | Kim et al. |
| 2009/0024956 | A1* | 1/2009 | Kobayashi ............ G06F 3/0481 715/784 |
| 2009/0040324 | A1 | 2/2009 | Nonaka |
| 2009/0042588 | A1 | 2/2009 | Lottin et al. |
| 2009/0058822 | A1 | 3/2009 | Chaudhri |
| 2009/0079846 | A1 | 3/2009 | Chou et al. |
| 2009/0132453 | A1 | 5/2009 | Hangartner et al. |
| 2009/0132665 | A1 | 5/2009 | Thomsen et al. |
| 2009/0160970 | A1 | 6/2009 | Fredlund et al. |
| 2009/0265647 | A1 | 10/2009 | Martin et al. |
| 2010/0082693 | A1* | 4/2010 | Hugg ..................... H04L 51/28 707/798 |
| 2010/0131880 | A1 | 5/2010 | Lee et al. |
| 2616/6131895 | | 5/2010 | Wohlert |
| 2010/0159944 | A1 | 6/2010 | Pascal et al. |
| 2010/0161831 | A1 | 6/2010 | Haas et al. |
| 2010/0185665 | A1 | 7/2010 | Horn et al. |
| 2010/0214436 | A1 | 8/2010 | Kim et al. |
| 2010/0223128 | A1 | 9/2010 | Dukellis et al. |
| 2010/0223343 | A1 | 9/2010 | Bosan et al. |
| 2010/0257196 | A1 | 10/2010 | Waters et al. |
| 2010/0281045 | A1 | 11/2010 | Dean |
| 2010/0306669 | A1 | 12/2010 | Della Pasqua |
| 2011/0004071 | A1 | 1/2011 | Faiola et al. |
| 2011/0040783 | A1 | 2/2011 | Uemichi et al. |
| 2011/0040804 | A1 | 2/2011 | Peirce et al. |
| 2011/0050909 | A1 | 3/2011 | Ellenby et al. |
| 2011/0050915 | A1 | 3/2011 | Wang et al. |
| 2011/0102630 | A1 | 5/2011 | Rukes |
| 2011/0125844 | A1 | 5/2011 | Collier et al. |
| 2011/0145564 | A1 | 6/2011 | Moshir et al. |
| 2011/0197194 | A1 | 8/2011 | D'Angelo et al. |
| 2011/0211534 | A1 | 9/2011 | Schmidt et al. |
| 2011/0213845 | A1 | 9/2011 | Logan et al. |
| 2011/0271308 | A1 | 11/2011 | Sutton-Shearer |
| 2011/0273575 | A1 | 11/2011 | Lee |
| 2011/0283188 | A1 | 11/2011 | Farrenkopf |
| 2011/0320373 | A1 | 12/2011 | Lee et al. |
| 2012/0028659 | A1 | 2/2012 | Whitney et al. |
| 2012/0062805 | A1 | 3/2012 | Candelore |
| 2012/0108293 | A1 | 5/2012 | Law et al. |
| 2012/0110096 | A1 | 5/2012 | Smarr et al. |
| 2012/0113272 | A1 | 5/2012 | Hata |
| 2012/0131507 | A1 | 5/2012 | Sparandara et al. |
| 2012/0131512 | A1* | 5/2012 | Takeuchi ............... G06Q 50/01 715/856 |
| 2012/0143760 | A1 | 6/2012 | Abulafia et al. |
| 2012/0150978 | A1 | 6/2012 | Monaco |

(56) References Cited

U.S. PATENT DOCUMENTS

| | | |
|---|---|---|
| 2012/0166971 A1* | 6/2012 | Sachson ............... G06Q 50/01 715/753 |
| 2012/0169855 A1 | 7/2012 | Oh |
| 2012/0173991 A1 | 7/2012 | Roberts et al. |
| 2012/0184248 A1 | 7/2012 | Speede |
| 2012/0200743 A1 | 8/2012 | Blanchflower et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0278387 A1 | 11/2012 | Garcia et al. |
| 2012/0278692 A1 | 11/2012 | Shi |
| 2012/0297339 A1 | 11/2012 | Ito |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0323933 A1 | 12/2012 | He et al. |
| 2013/0033486 A1 | 2/2013 | Mccartney et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0125062 A1 | 5/2013 | Lee et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0179947 A1 | 7/2013 | Kline, III et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0197951 A1 | 8/2013 | Watson et al. |
| 2013/0219339 A1 | 8/2013 | Wiese et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0305170 A1 | 11/2013 | De Souza et al. |
| 2013/0344896 A1 | 12/2013 | Kirmse et al. |
| 2013/0346877 A1 | 12/2013 | Borovoy et al. |
| 2013/0346914 A1 | 12/2013 | Jeong |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0122658 A1 | 5/2014 | Haeger et al. |
| 2014/0122787 A1 | 5/2014 | Shalvi et al. |
| 2014/0129953 A1* | 5/2014 | Spiegel ............... G06F 3/01 715/741 |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein |
| 2014/0317302 A1 | 10/2014 | Naik |
| 2014/0325383 A1 | 10/2014 | Brown et al. |
| 2015/0046278 A1 | 2/2015 | Pei et al. |
| 2015/0082342 A1 | 3/2015 | Norwood et al. |
| 2016/0094504 A1 | 3/2016 | Cinar et al. |

OTHER PUBLICATIONS

"U.S. Appl. No. 13/672,654, Decision on Pre-Appeal Brief Request dated Dec. 17, 2013", 2 pgs.

"U.S. Appl. No. 13/672,654, Final Office Action dated Jul. 19, 2013", 9 pgs.

"U.S. Appl. No. 13/672,654, Non Final Office Action dated Feb. 14, 2013", 8 pgs.

"U.S. Appl. No. 13/672,654, Notice of Allowance dated Mar. 3, 2014", 12 pgs.

"U.S. Appl. No. 13/672,654, Pre-Appeal Brief Request filed Sep. 11, 2013", 5 pgs.

"U.S. Appl. No. 13/672,654, Response filed Jan. 14, 2014 to Decision on Pre-Appeal Brief Request dated Dec. 17, 2013", 3 pgs.

"U.S. Appl. No. 13/672,654, Response filed Apr. 23, 2013 to Non Final Office Action dated Feb. 14, 2013", 5 pgs.

"U.S. Appl. No. 13/672,654, Response filed Aug. 16, 13 to Final Office Action dated Jul. 19, 2013", 4 pgs.

"U.S. Appl. No. 14/325,260, Non Final Office Action dated Oct. 23, 2014", 6 pgs.

"U.S. Appl. No. 14/325,260, Notice of Allowance dated Jan. 12, 2015", 6 pgs.

"U.S. Appl. No. 14/325,260, Response filed Nov. 17, 2014 to Non Final Office Action dated Oct. 23, 2014", 2 pgs.

"U.S. Appl. No. 14/701,494, Non Final Office Action dated Jun. 19, 2017", 7 pgs.

"U.S. Appl. No. 14/701,494, Notice of Allowance dated Dec. 12, 2017", 6 pgs.

"U.S. Appl. No. 14/701,494, Response filed Sep. 14, 2017 to Non Final Office Action dated Jun. 19, 2017", 2 pgs.

"U.S. Appl. No. 15/851,121, Examiner Interview Summary dated Feb. 4, 2020", 3 pgs.

"U.S. Appl. No. 15/851,121, Final Office Action dated May 6, 2020", 6 pgs.

"U.S. Appl. No. 15/851,121, Non Final Office Action dated Aug. 21, 2019", 8 pgs.

"U.S. Appl. No. 15/851,121, Notice of Allowance dated Sep. 2, 2020", 9 pgs.

"U.S. Appl. No. 15/851,121, Response filed Feb. 3, 2020 to Non Final Office Action dated Aug. 21, 2019", 9 pgs.

"U.S. Appl. No. 15/851,121, Response filed Aug. 6, 2020 to Final Office Action dated May 6, 2020", 8 pgs.

"U.S. Appl. No. 15/851,121, Supplemental Notice of Allowability dated Oct. 22, 2020".

"International Application Serial No. PCT/US2014/040346, International Search Report dated Mar. 23, 2015", 2 pgs.

"International Application Serial No. PCT/US2014/040346, Written Opinion dated Mar. 23, 2015", 6 pgs.

"IVisit Mobile: Getting Started", IVISIT, [Online] Retrieved from the Internet: <URL: http://web.archive.org/web/20140830174355/http://ivisit.com/support_mobile>, (Dec. 4, 2013), 16 pgs.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

White, Charlie, "How to Enable the New Facebook Timeline Now", URL: http://mashable.com/2011/09/22/how-to-facebook-timeline/, (Sep. 22, 2011), 13 pgs.

U.S. Appl. No. 13/672,654, U.S. Pat. No. 8,775,972, filed Nov. 8, 2012, Apparatus and Method for Single Action Control of Social Network Profile Access.

(56) References Cited

OTHER PUBLICATIONS

U.S. Appl. No. 14/325,260, U.S. Pat. No. 9,026,943, filed Jul. 7, 2014 Apparatus and Method for Single Action Control of Social Network Profile Access.
U.S. Appl. No. 14/701,494, U.S. Pat. No. 9,332,907, filed Apr. 30, 2015, Apparatus and Method For Single Action Control of Social Network Profile Access.
U.S. Appl. No. 15/853,123, filed Dec. 21, 2017, Interactive Use-Interface To Adjust Access Privileges.

\* cited by examiner

INTERACTIVE USER-INTERFACE TO ADJUST ACCESS PRIVILEGES

CROSS REFERENCE TO RELATED APPLICATIONS

This application is a continuation of U.S. patent application Ser. No. 15/851,121, filed Dec. 21, 2017, which is a continuation of U.S. patent application Ser. No. 14/701,494, filed Apr. 30, 2015, now issued as U.S. Pat. No. 9,882,907, which is a continuation of U.S. patent application Ser. No. 14/325,260 filed Jul. 7, 2014, now issued as U.S. Pat. No. 9,026,943, which is a continuation of U.S. patent application Ser. No. 13/672,654 filed Nov. 8, 2012, now U.S. Pat. No. 8,775,972 issued Jul. 8, 2014, the contents of which are incorporated herein by reference.

FIELD OF THE INVENTION

This invention relates generally to communications in computer networks. More particularly, this invention relates to single action control of social network profile access.

BACKGROUND OF THE INVENTION

A social network service is an online service, platform or site that facilitates the building and maintenance of social relations among individuals. Each member of a social network service maintains a profile with user information and user posts, which may be comments, photographs, videos, endorsements and the like. The posts may be from the user and/or individuals that the user is affiliated with in the social network. In this way, social network sites allow users to share ideas, activities, events and interests with affiliated individuals.

Privacy is a growing concern with social networks. Information posted by a user or an affiliated individual may be distasteful or become outdated. The user may desire to restrict access to certain information on their profile while allowing access to other information. While most social networks have configurable privacy control settings, such privacy control settings may be hard to find and in many instances they are confusing, resulting in an unintended access to information. Given that users are generally able to see all of the content that they have contributed to their profile, it can be difficult to determine what content is visible to others and what is visible only to the user.

Accordingly, improved techniques for controlling social network profile access are desirable.

SUMMARY OF THE INVENTION

A computer implemented method includes allowing a user to access a user-controlled social network profile page with posts in a specified order. A user is permitted to traverse an interface element across the specified order to establish a set position for the interface element. Access to posts is provided on a first side of the set position to define a viewable profile. Access to posts is blocked on a second side of the set position to define a non-viewable profile.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
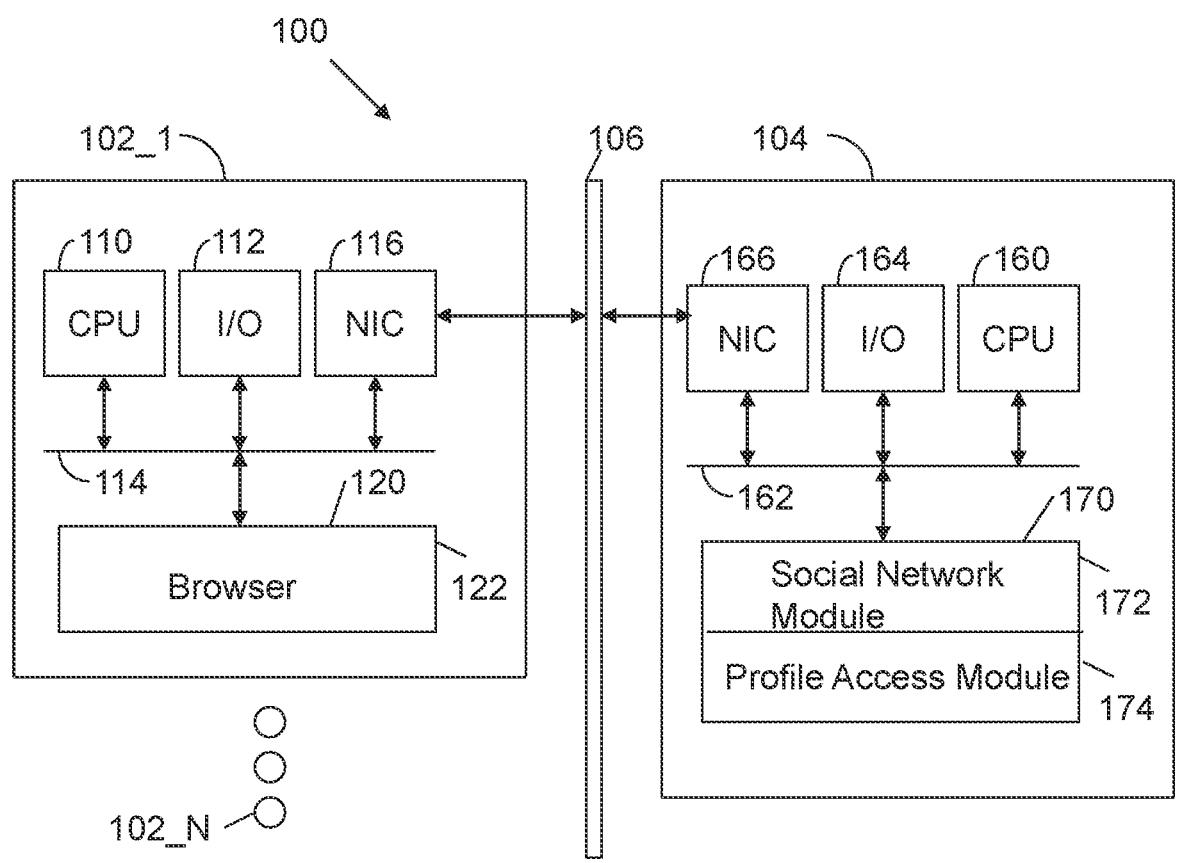
FIG. 1 illustrates a system configured in accordance with an embodiment of the invention.

FIG. 1 illustrates a system 100 configured in accordance with an embodiment of the invention. The system 100 includes a set of client devices 102_1 through 102_N and at least one server 104 connected via a network 106, which may be any wired or wireless network.

Each client device 102 may be a computer, tablet, Smartphone and the like with standard components, such as a central processing unit 110 connected to input/output devices 112 via a bus 114. The input/output devices 112 may include a touch display, keyboard, mouse and the like. A network interface circuit 116 is also connected to the bus 114 to provide connectivity with network 106.

A memory 120 is also connected to the bus 114. The memory 120 stores standard components, such as a browser 122, which allow one to access a social network site, such as a social network site hosted on server 104. Server 104 also includes standard components, such as a central processing unit 160 connected to input/output devices 164 via a bus 162. A network interface circuit 166 is also connected to the bus 162. Further, a memory 170 is connected to the bus 162. The memory 170 stores modules of executable instructions to implement disclosed operations. For example, the memory 170 may store a social network module 172, which supports standard social network operations, such as hosting profile pages, maintaining social graphs for individual users and facilitating communication between the individual users.

The memory 170 also stores a profile access module 174. The profile access module 174 includes executable instructions to implement operations of the invention. In particular, the profile access module 174 includes executable instructions to allow a user to manipulate an interface element to establish single action control of social network profile access. The interface element may be any object (e.g., bar, line, circle) that partitions one set of information from another set of information.

Figure 2:
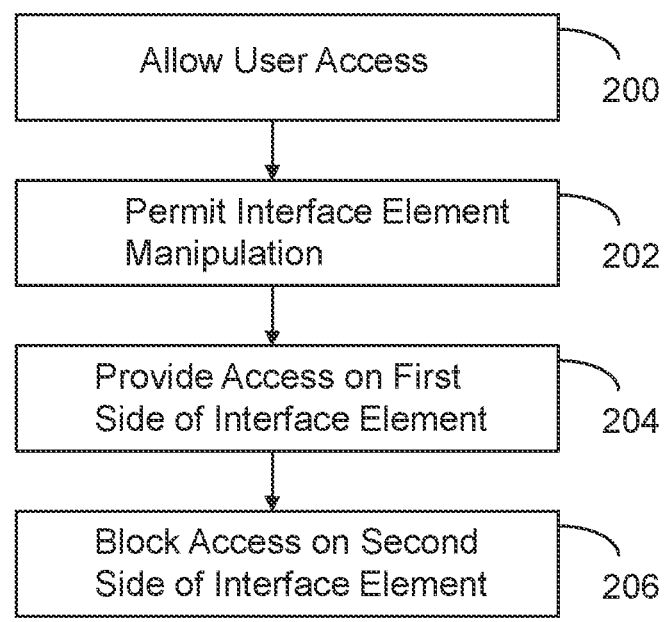
FIG. 2 illustrates processing operations associated with an embodiment of the invention.

FIG. 2 illustrates processing operations associated with an embodiment of the profile access module 174. Initially, a user is allowed access to a user-controlled social network profile page 200. For example, a client device 102 may access the social network module 172 of the server 104. In response, the server 104 supplies to the client a user-controlled social network profile page.

Figure 3:
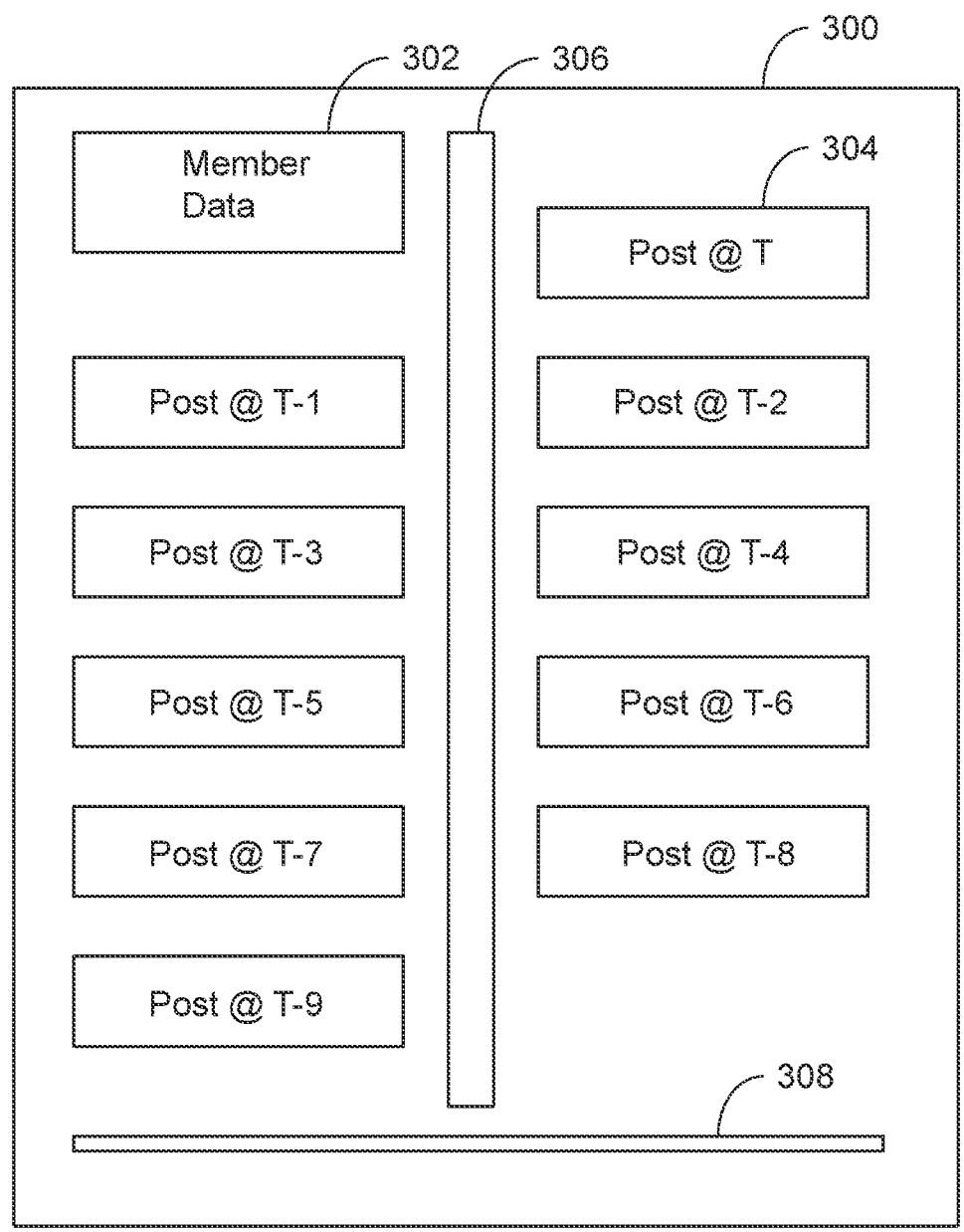
FIG. 3 illustrates a profile page with a single action interface element utilized in accordance with an embodiment of the invention.

FIG. 3 illustrates a user-controlled social network profile page 300, which may be displayed on a client device. The profile page 300 includes member data 302. The member data 302 may specify the member's name, biographic information, interests and the like. In one embodiment of the invention, the member data 302 is in a fixed position such that it is always viewable.

The profile page 300 also includes posts 304 in a specified order, in this case along a temporal axis 306. In this example, there are 10 posts. The latest post is "Post@T", while earlier posts are marked "Post@T-1" through "Post@T-9". FIG. 3 also illustrates an interface element 308, in this case, the interface element is referred to as a privacy bar.

Figure 4:
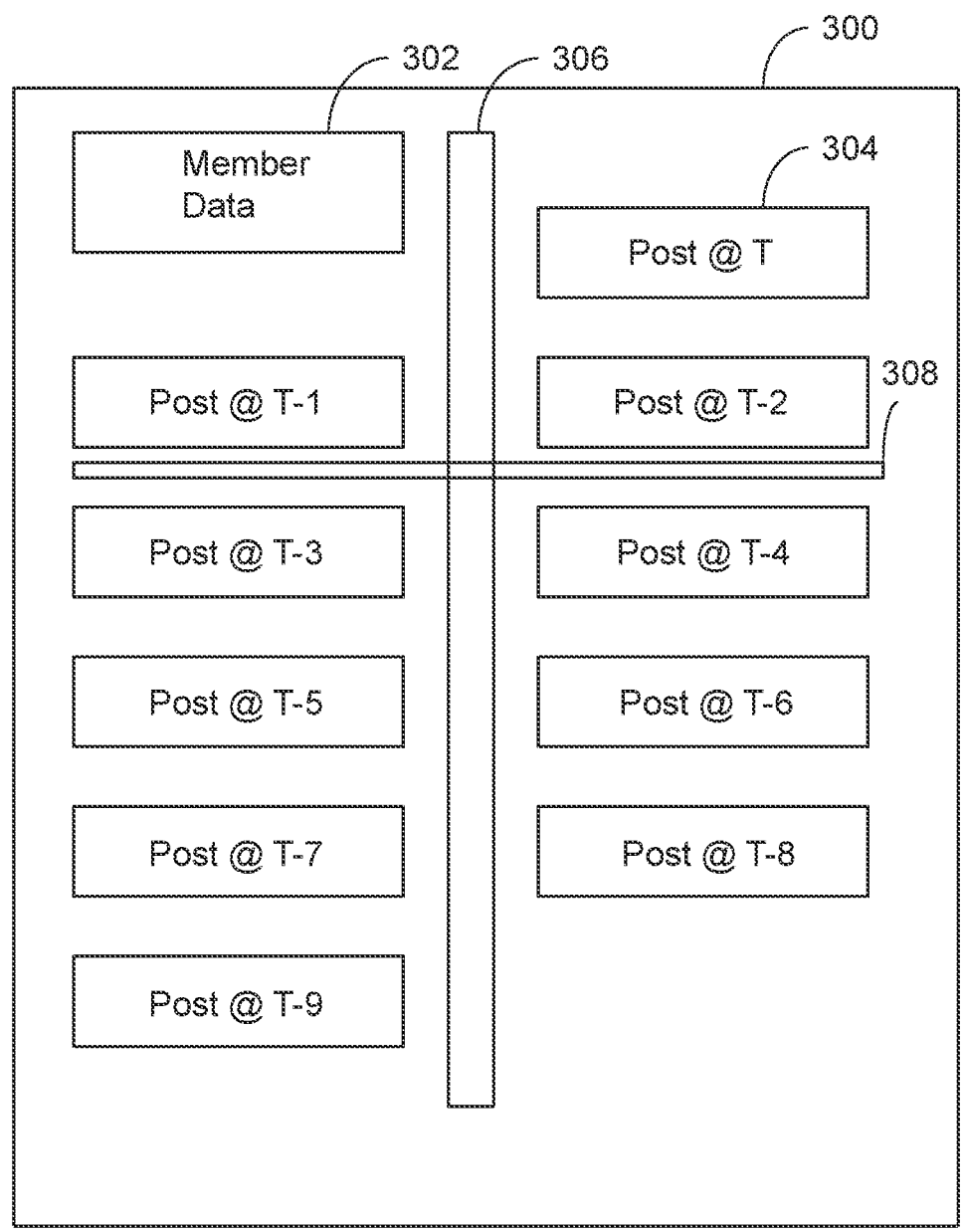
FIG. 4 illustrates a profile page with a re-positioned interface element.

Returning to FIG. 2, the next operation performed by the profile access module 174 is to permit the interface element to be manipulated 202. For example, the interface element 308 may be dragged with a single action gesture applied to a touch display of the client device. Alternately, the interface element 308 may be manipulated through a single action mouse stroke or keyboard stroke. The interface element 308 is manipulated along the temporal axis 306. As the interface element 308 is manipulated, the server 104 refreshes the profile page 300 displayed on the client device. FIG. 4 illustrates an example of a refreshed profile page with the interface element 308 at a new position. Observe that the user of the user-controlled social network profile page can still view posts on either side of the interface element 308. However, members of the user's social network have limited post access. That is, as shown in FIG. 2, social profile access is provided on a first side of the interface element 204. In this example, social profile access is provided on top of the interface element 308. Access is blocked on the second side of the interface element 206. In this example, social profile access is blocked on the bottom of the interface element.

Figure 5:
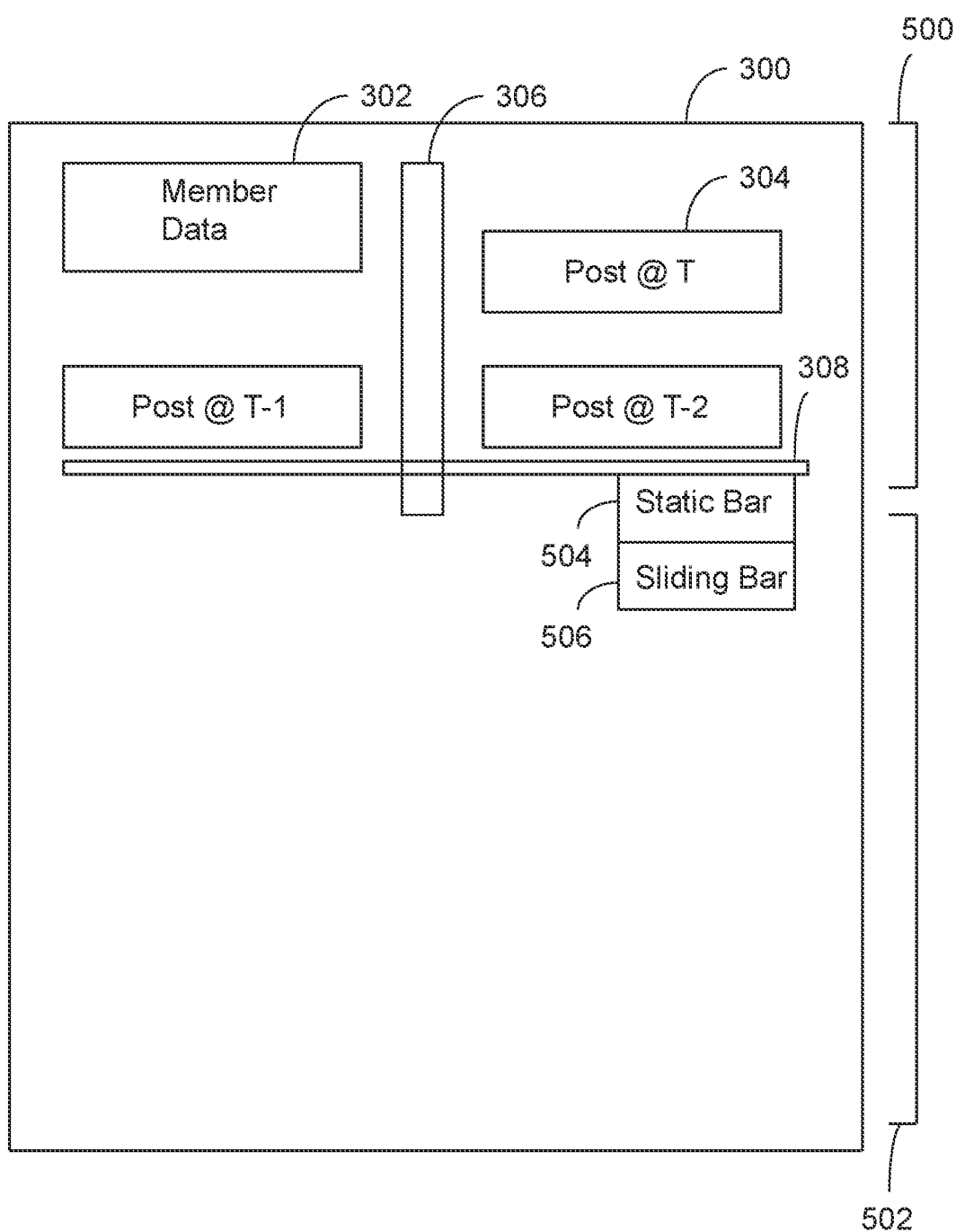
FIG. 5 illustrates a profile page with that provides selective profile information in accordance with an embodiment of the invention.

FIG. 5 illustrates this functionality. In particular, FIG. 5 illustrates the provision of access to posts on the first side of the bar position to define a viewable profile 500. FIG. 5 also illustrates the blocking of access to posts on a second side of the bar position to define a non-viewable profile 502.

The interface element 308 may include a configurable setting to establish the future position of the interface element 308. As shown in FIG. 5, a user may select a static interface element 504 or a sliding interface element 506. The system may have a default to one option or the other. In the case of a static bar, as time advances the viewable profile expands. That is, the currently viewable posts "Post@T", Post@T-1" and "Post@T-2" would remain viewable and additional posts would be positioned on top of them in temporal order. In the case of a sliding bar, as time advances, the viewable profile maintains a static temporal window size. In this example, the viewable profile would include a temporal window size for three posts. Thus, as new posts arrive, an older post, such as "Post@T-2" would slide into the non-viewable profile region 502 to make room for the new posts. In this way, a listing of all posts is maintained, but access to the posts is limited. Accordingly, a user can make those posts available at a later time, if desired, by moving the interface element 508 down the temporal axis 306.

Figure 6:
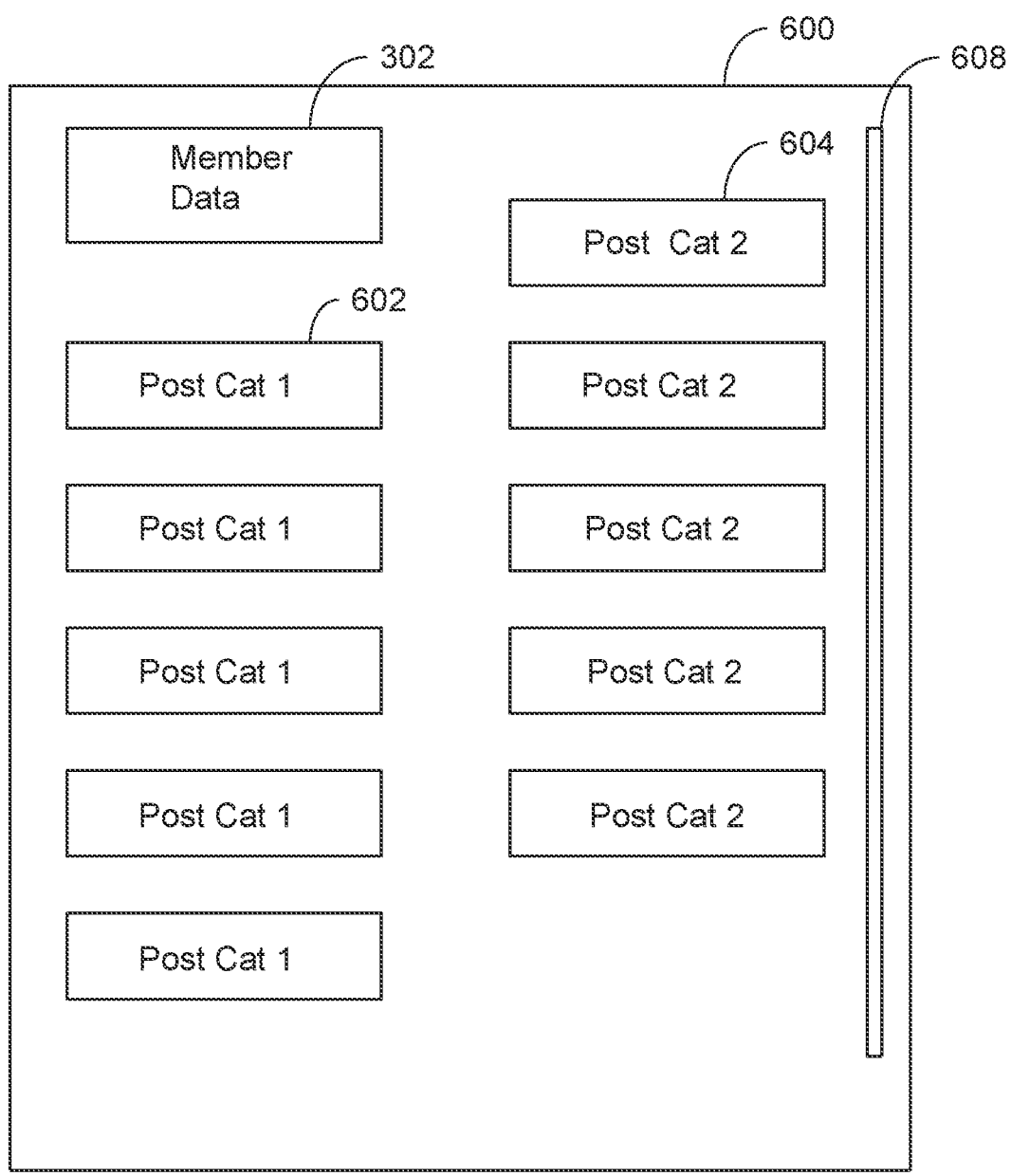
FIG. 6 illustrates a profile page ordered by category.
Figure 7:
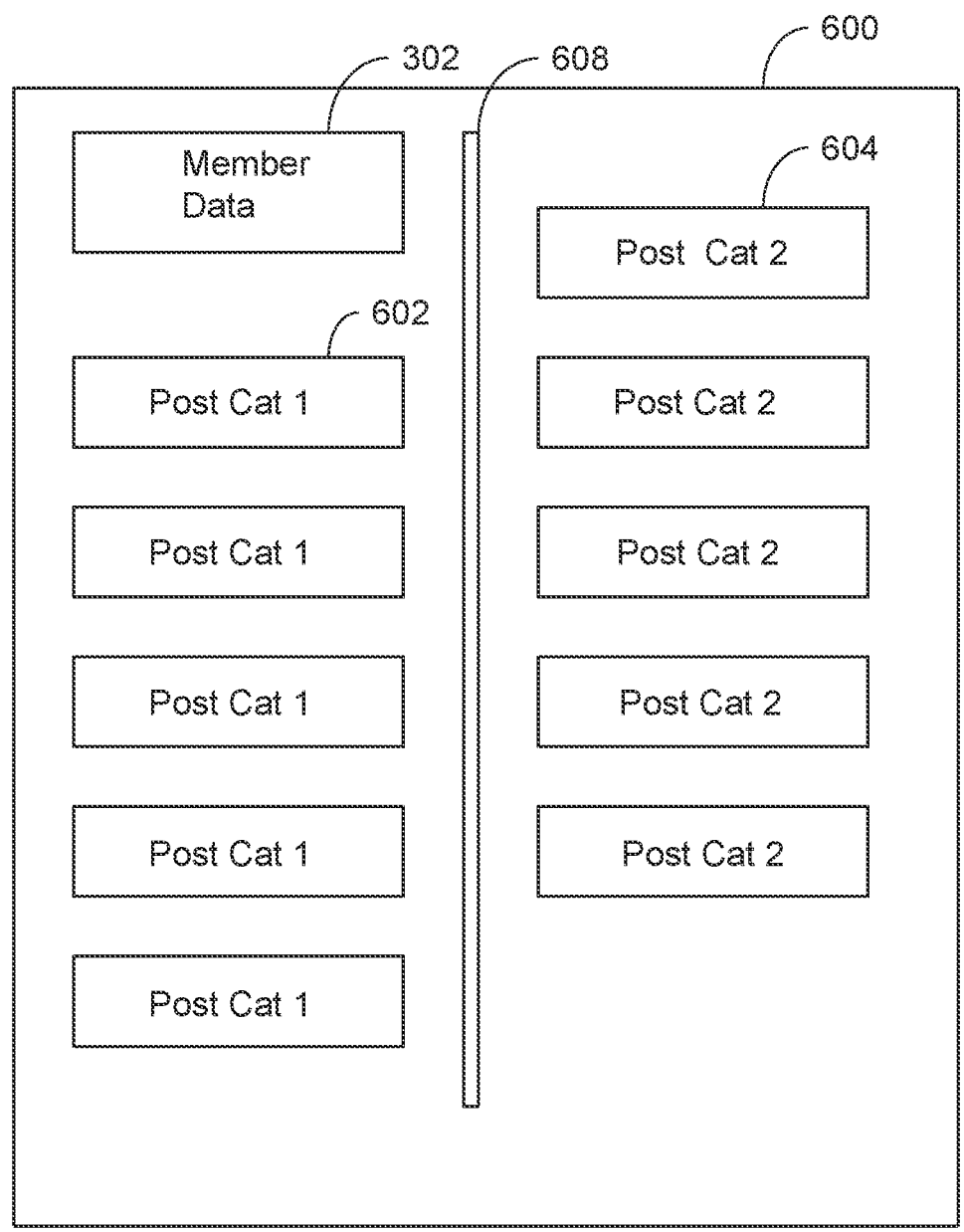
FIG. 7 illustrates the profile page of FIG. 6 with a re-positioned interface element.
Figure 8:
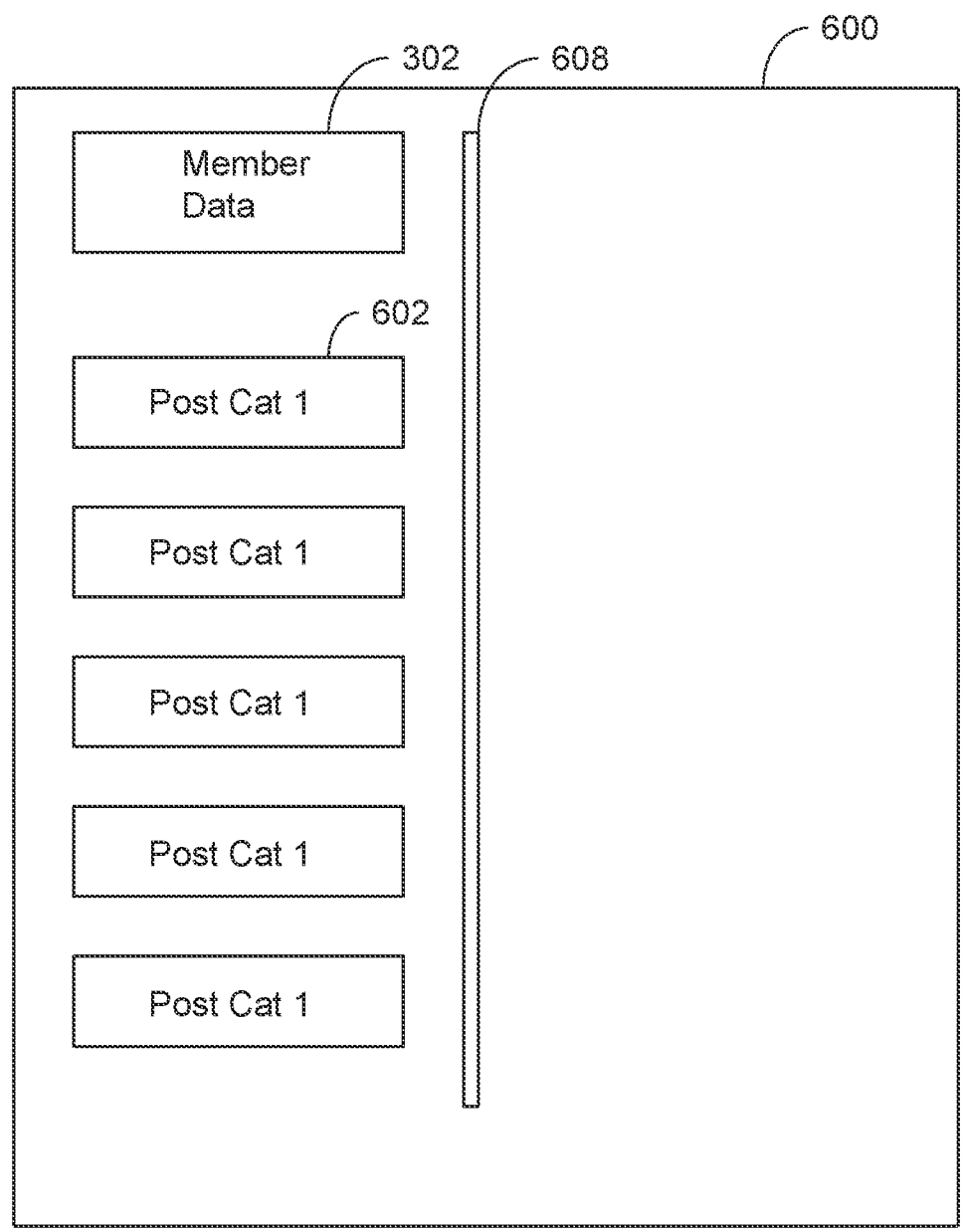
FIG. 8 illustrates the profile page of FIG. 5 with a set privacy control bar that provides selective profile information in accordance with an embodiment of the invention.

The processing operations of FIG. 2 may be applied to profile pages with different configurations. For example, FIG. 6 illustrates a profile page 600 with member data 302 and posts organized by category. In particular, there is a column of posts 602 in a first category and a colon n of posts 604 in a second category. The category may be established by content, sub-sets of social network members or other criteria. A vertical interface element 608 may be manipulated across category regions. FIG. 7 illustrates a re-positioned interface element 608. Again, the user observes posts on either side of the interface element 608. However, as shown in FIG. 8, members of the user's social network only see posts in the first category 602, while posts in the second category are blocked.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of presenting an interactive user interface on a touch display of a client device, the method comprising:
presenting member data within a social network interface, the member data being presented in a fixed position within the social network interface;
presenting a plurality of posts arranged according to at least one of content or social network contacts within the social network interface;
presenting a privacy bar interface element at a first position within the social network interface, wherein the first position does not divide the plurality of posts based on the content or social network contacts;
detecting an action to move the privacy bar interface element from the first position to a second position within the social network interface, wherein the second position divides the plurality of posts into a first subset of posts and a second subset of posts based on the content or social network contacts; and
applying, based on detecting the action, first and second social profile access privileges to the respective first and second subsets of posts, the first and second social profile access privileges being different from each other.

2. The method of claim 1, wherein the first social profile access privileges, as applied to the first subset of posts, enables members of a social network of a user to have access to the first subset of posts.

3. The method of claim 2, wherein the second social profile access privileges, as applied to the second subset of posts, blocks the members of the social network of the user from having access to the second subset of posts.

4. The method of claim 3, wherein the user is provided with access to both the first and second subsets of posts within the social network interface subsequent to the detection of the action, while the first and second social profile access privileges are applied with respect to the members of the social network of the user.

5. The method of claim 1, wherein the privacy bar interface element comprises a first configurable setting to enable a viewable profile region to expand as time advances.

6. The method of claim 5, wherein the privacy bar interface element further comprises a second configurable setting to set the viewable profile region to be a static temporal window size as time advances.

7. The method of claim 1, wherein the privacy bar interface element comprises a vertical bar which when moved to the second position, provides for the first subset of posts to be positioned on a left side of the vertical bar and for the second subset of posts to be positioned on a right side of the vertical bar.

8. A system comprising:
a processor; and
a memory storing instructions that, when executed by the processor, configure the processor to perform operations comprising:
presenting member data within a social network interface, the member data being presented in a fixed position within the social network interface;
    presenting a plurality of posts arranged according to at least one of content or social network contacts within the social network interface;
    presenting a privacy bar interface element at a first position within the social network interface, wherein the first position does not divide the plurality of posts based on the content or social network contacts;
    detecting an action to move the privacy bar interface element from the first position to a second position within the social network interface, wherein the second position divides the plurality of posts into a first subset of posts and a second subset of posts based on the content or social network contacts; and
    applying, based on detecting the action, first and second social profile access privileges to the respective first and second subsets of posts, the first and second social profile access privileges being different from each other.

9. The system of claim 8, wherein the first social profile access privileges, as applied to the first subset of posts, enables members of a social network of a user to have access to the first subset of posts.

10. The system of claim 9, wherein the second social profile access privileges, as applied to the second subset of posts, blocks the members of the social network of the user from having access to the second subset of posts.

11. The system of claim 10, wherein the user is provided with access to both the first and second subsets of posts within the social network interface subsequent to the detection of the action, while the first and second social profile access privileges are applied with respect to the members of the social network of the user.

12. The system of claim 8, wherein the privacy bar interface element comprises a first configurable setting to enable a viewable profile region to expand as time advances.

13. The system of claim 12, wherein the privacy bar interface element further comprises a second configurable setting to set the viewable profile region to be a static temporal window size as time advances.

14. The system of claim 8, wherein the privacy bar interface element comprises a vertical bar which when moved to the second position, provides for the first subset of posts to be positioned on a left side of the vertical bar and for the second subset of posts to be positioned on a right side of the vertical bar.

15. A non-transitory computer-readable storage medium, the computer-readable storage medium including instructions that when executed by a computer, cause the computer to perform operations comprising:
    presenting a plurality of posts arranged according to at least one of content or social network contacts within the social network interface;
    presenting a privacy bar interface element at a first position within the social network interface, wherein the first position does not divide the plurality of posts based on the content or social network contacts;
    detecting an action to move the privacy bar interface element from the first position to a second position within the social network interface, wherein the second position divides the plurality of posts into a first subset of posts and a second subset of posts based on the content or social network contacts; and
    applying, based on detecting the action, first and second social profile access privileges to the respective first and second subsets of posts, the first and second social profile access privileges being different from each other.

16. The computer-readable storage medium of claim 15, wherein the first social profile access privileges, as applied to the first subset of posts, enables members of a social network of a user to have access to the first subset of posts.

17. The computer-readable storage medium of claim 16, wherein the second social profile access privileges, as applied to the second subset of posts, blocks the members of the social network of the user from having access to the second subset of posts.

18. The computer-readable storage medium of claim 17, wherein the user is provided with access to both the first and second subsets of posts within the social network interface subsequent to the detection of the action, while the first and second social profile access privileges are applied with respect to the members of the social network of the user.

19. The computer-readable storage medium of claim 15, wherein the privacy bar interface element comprises a first configurable setting to enable a viewable profile region to expand as time advances.

20. The computer-readable storage medium of claim 19, wherein the privacy bar interface element further comprises a second configurable setting to set the viewable profile region to be a static temporal window size as time advances.

* * * * *